United States Patent [19]
Arold

[11] Patent Number: 5,777,394
[45] Date of Patent: Jul. 7, 1998

[54] SEAT ADJUSTING SWITCH PARTICULARLY FOR VEHICLE SEATS

[75] Inventor: Klaus Arold, Sindelfingen, Germany

[73] Assignee: Mercedes-Benz AG, Stuttgart, Germany

[21] Appl. No.: 783,001

[22] Filed: Jan. 14, 1997

[30] Foreign Application Priority Data

Jan. 15, 1996 [DE] Germany .................. 196 01 920.6

[51] Int. Cl.$^6$ .................................................. B60R 27/00
[52] U.S. Cl. .................................................. 307/10.1
[58] Field of Search .................. 307/9.1, 10.1, 307/119, 10.2; 180/315, 320, 333; 200/61.58 R, 293, 5 R; 174/69, DIG. 9; 364/424.059, 424.045; 248/475.1; 701/49, 36

[56] References Cited

U.S. PATENT DOCUMENTS

| | | | |
|---|---|---|---|
| Re. 33,423 | 11/1990 | Lobanoff | 248/475.1 |
| 4,387,718 | 6/1983 | Bilitz et al. | |
| 5,086,510 | 2/1992 | Guenther et al. | |
| 5,140,112 | 8/1992 | Ritter | 200/61.58 R |
| 5,475,592 | 12/1995 | Wnuk et al. | 307/10.1 |

FOREIGN PATENT DOCUMENTS

| | | |
|---|---|---|
| 77 17 085.5 | 9/1977 | Germany . |
| 4128663A1 | 12/1992 | Germany . |
| 1007285 | 10/1963 | United Kingdom . |
| 2266578 | 11/1993 | United Kingdom . |

OTHER PUBLICATIONS

Search Report, Mar. 7, 1997, Great Britain.

*Primary Examiner*—Richard T. Elms
*Attorney, Agent, or Firm*—Evenson McKeown Edwards & Lenahan, PLLC

[57] ABSTRACT

A seat adjusting switch assembly for vehicle seats includes manual setting and display elements for accommodating changes in seat part positions and for programmed seat part positions. In a first condition of the seat adjusting switch, only the memory setting and display elements are visible and operable by a vehicle occupant and, in a second condition, all setting and display elements are visible and operable, the first and second conditions being settable by the occupant.

13 Claims, 2 Drawing Sheets

SEAT ADJUSTING SWITCH PARTICULARLY FOR VEHICLE SEATS

BACKGROUND AND SUMMARY OF THE INVENTION

This invention relates to a seat adjusting switch particularly for vehicle seats of the type having setting and display elements for adjusting seat positions and program elements for effecting memory stored seat position settings.

Seat adjusting switches of this type have a plurality of display and adjusting elements which, if such switches are closely surrounded also by other switching elements, may confuse the operating person.

In the case of seat adjusting switches of the above-mentioned type, it is frequently sufficient for the operating person, that is, particularly for the driver or front passenger of a motor vehicle, to be able to operate the program elements for the memory settings and to be able to recognize their display.

An object of the invention is to provide a seat adjusting switch assembly which accommodates both normal setting of seat positions and memory selected setting of seat positions, while avoiding confusion of the occupant caused by close spacing of the switch part. This object is achieved according to the invention by providing a switch which can be selectively positioned in first and second conditions with the first condition leaving only the memory stored position selection with switch elements in an occupant accessible operable mode and the second condition placing all seat adjusting switch setting and display elements in an occupant accessible operable mode.

The invention is based on the idea of normally only having the program elements for the memory settings present in a visible and operable manner. As a result, for example, the driver of a vehicle can easily recognize the just set memory setting and can change it by operating the respective exposed operating elements of the seat adjusting switch. If an operating person desires a memory setting which is different than the preprogrammed memory setting or wants to change the memory setting as such, the other setting and display elements of the seat adjusting switch can be exposed. In a correspondingly set condition of the seat adjusting switch, these elements may also remain exposed until a later intended condition change of the seat adjusting switch.

According to preferred embodiments of the invention, the condition changes of the seat adjusting switch can also be achieved by means of different positions of the switch itself or by different positions of a covering assigned to the switch.

Although it is known from German Patent Document DE 77 17 085.5 to mount control elements on the armrest of a vehicle seat in such a manner that they can be covered when not in use, in the case of this known construction, no display exists in the covered position and an operation of selected control elements is no longer possible.

Furthermore, from German Patent Document DE 41 28 563 A1, an operating and display device is known which can be used, for example, on the dashboard of a vehicle and which can be covered. Also there, in contrast to the invention, in the covered condition, selected control elements can no longer be operated and no display is provided with respect to such selected control elements.

Other objects, advantages and novel features of the present invention will become apparent from the following detailed description of the invention when considered in conjunction with the accompanying drawings.

DETAILED DESCRIPTION OF THE DRAWINGS

A seat adjusting switch 1 is displaceably disposed in an opening 2 of a door.

Figure 1:
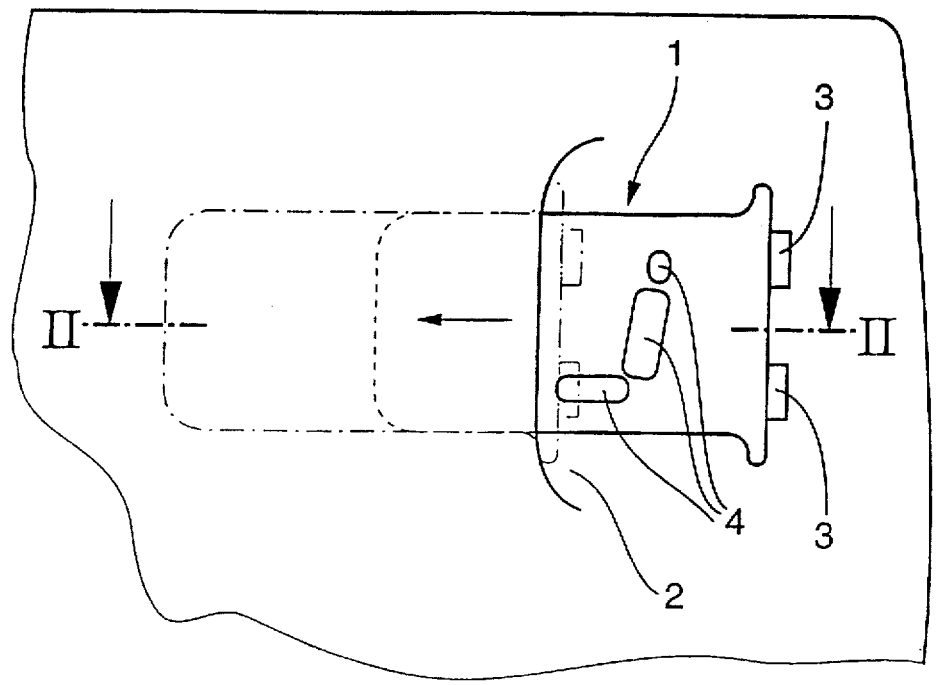
FIG. 1 is a schematic view of a door covering of a driver's door of a motor vehicle and showing a seat adjusting switch arrangement constructed according to a preferred embodiment of the present invention.

In FIG. 1, the solid lines of the seat adjusting switch 1 illustrate the pulled-out condition of the seat adjusting switch 1. In the pushed-in condition, only a front area of the seat adjusting switch projects out of the opening, as indicated in FIG. 1 by dash-dotted lines.

On the front side of the seat adjusting s witch 1, the display and adjusting elements for the memory settings are situated which are still visible and operable also in the pushed-in condition and which are called program elements 3 in this case.

The other adjusting elements 4 for he inividual seat adjustment are situated in a part of the seat adjusting switch 1 in which they are invisible and inoperable in the pushed-in condition of the seat adjusting switch 1.

By means of the embodiment of a seat adjusting switch 1 with memory setting elements, the clearness of the operating elements can be considerably improved for a normal case in which only the memory settings are to be recognizable and changeable. This applies particularly to cases in which a number of other operating elements are also situated in the surroundings of the seat adjusting switch.

Figure 2:
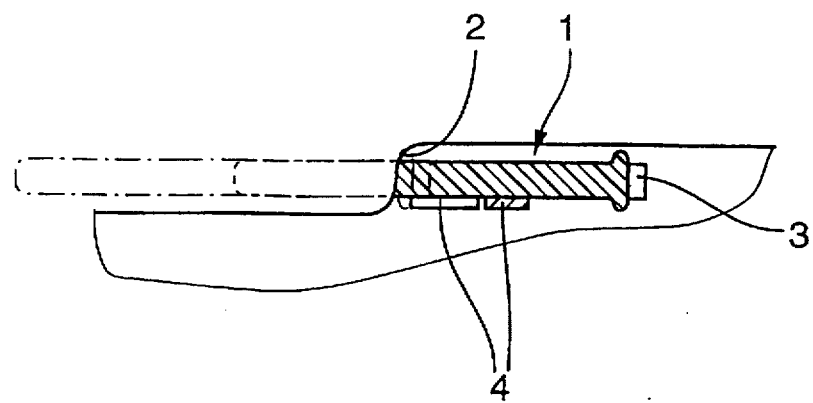
FIG. 2 is a sectional view of the door taken along Line II—II in FIG. 1.
Figure 2A:
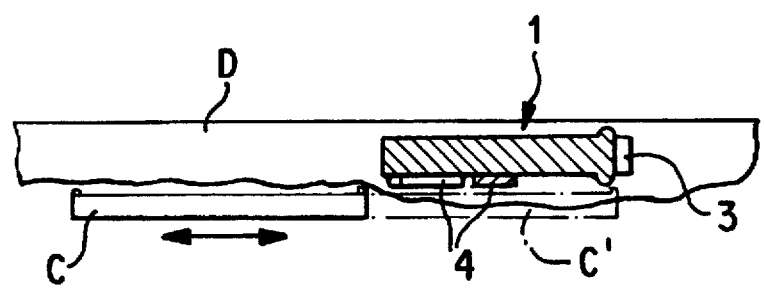
FIG. 2A is a sectional view of the door taken along Line II—II in FIG. 1 and showing an alternative embodiment of the invention.

FIG. 2A schematically depicts an alternative embodiment wherein a cover C is disposed to be movable between a position C'(shown in dash lines), wherein only the program elements 3 are visible and operable while the other adjusting elements 4 are covered, and a position (shown in solid lines) wherein all of the elements 3 and 4 are visible and accessible.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A seat adjusting switch assembly for vehicle seats comprising:

manually operable manual setting and display elements accommodating manual setting of seat part positions, and manually operable memory setting and display elements accommodating storing, setting and retrieval of memory stored seat part positions, wherein said seat adjusting switch assembly is selectively operably switchable between first and second operating conditions, said first condition providing occupant accessibility to only the memory setting and display elements and said second condition providing occupant accessibility to said manual setting and display elements.

2. A seat adjusting switch assembly according to claim 1, wherein said first condition corresponds to relative movement of a part of the seat adjusting switch assembly under a covering and into an opening provided at the vehicle.

3. A seat adjusting switch assembly according to claim 1, wherein said adjusting switch assembly is mounted at a vehicle side door to be movable between said first and second condition.

4. A seat adjusting switch assembly according to claim 2, wherein the side door includes an opening with a covering for accommodating the adjusting switch assembly, said adjusting switch assembly being slidably movable between the first and second conditions with the first condition corresponding to movement of the manual setting and display elements under the covering and the second condition corresponding to movement of the manual setting and display elements out of the opening from under the covering.

5. A seat adjusting switch assembly according to claim 1, wherein said second condition provides occupant accessibility to both said manual setting and display elements and said memory setting and display elements.

6. A seat adjusting switch assembly according to claim 2, wherein said second condition provides occupant accessibility to both said manual setting and display elements and said memory setting and display elements.

7. A seat adjusting switch assembly according to claim 3, wherein said second condition provides occupant accessibility to both said manual setting and display elements and said memory setting and display elements.

8. A seat adjusting switch assembly according to claim 4, wherein said second condition provides occupant accessibility to both said manual setting and display elements and said memory setting and display elements.

9. A seat adjusting switch assembly according to claim 1, wherein the different conditions of the seat adjusting switch are caused by different positions of a covering assigned to the seat adjusting switch.

10. A seat adjusting switch assembly according to claim 5, wherein the different conditions of the seat adjusting switch are caused by different positions of a covering assigned to the seat adjusting switch.

11. A seat adjusting switch assembly according to claim 6, wherein the different conditions of the seat adjusting switch are caused by different positions of a covering assigned to the seat adjusting switch.

12. A seat adjusting switch assembly according to claim 7, wherein the different conditions of the seat adjusting switch are caused by different positions of a covering assigned to the seat adjusting switch.

13. A seat adjusting switch assembly according to claim 8, wherein the different conditions of the seat adjusting switch are caused by different positions of a covering assigned to the seat adjusting switch.

* * * * *